(12) United States Patent
Kantharaj et al.

(10) Patent No.: US 11,556,409 B2
(45) Date of Patent: Jan. 17, 2023

(54) FIRMWARE FAILURE REASON PREDICTION USING MACHINE LEARNING TECHNIQUES

(71) Applicant: Dell Products L.P., Round Rock, TX (US)

(72) Inventors: Shankar Kantharaj, Toronto (CA); Nishanth Arya, Bangalore (IN); Mayank Kapoor, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 17/153,370

(22) Filed: Jan. 20, 2021

(65) Prior Publication Data

US 2022/0229720 A1 Jul. 21, 2022

(51) Int. Cl.
*G06F 11/00* (2006.01)
*G06F 11/07* (2006.01)
*G06N 20/00* (2019.01)
*G06F 11/34* (2006.01)

(52) U.S. Cl.
CPC ........ *G06F 11/0793* (2013.01); *G06F 11/079* (2013.01); *G06F 11/0787* (2013.01); *G06F 11/3476* (2013.01); *G06N 20/00* (2019.01)

(58) Field of Classification Search
CPC ............... G06F 11/0787; G06F 11/079; G06F 11/0793; G06F 11/3476; G06N 20/00
See application file for complete search history.

(56) References Cited

U.S. PATENT DOCUMENTS

| 10,613,962 | B1* | 4/2020 | Delange | G06N 7/005 |
| 11,237,892 | B1* | 2/2022 | Kedlaya | G06F 11/0751 |
| 2019/0004891 | A1* | 1/2019 | Bi | G06F 11/0793 |
| 2020/0005093 | A1* | 1/2020 | Vichare | H04Q 9/00 |
| 2020/0110655 | A1* | 4/2020 | Harwood | G06F 11/079 |
| 2020/0174972 | A1* | 6/2020 | Ranjan | G06F 11/0787 |

(Continued)

OTHER PUBLICATIONS https://www.intel.com/content/www/us/en/software/intel-memory-failure-prediction.html, downloaded Jan. 12, 2021.

(Continued)

*Primary Examiner* — Joshua P Lottich
(74) *Attorney, Agent, or Firm* — Ryan, Mason & Lewis, LLP (57) ABSTRACT

Techniques are provided for predicting firmware installation failure reasons using machine learning techniques. One method comprises obtaining log data for a user device, wherein the log data is obtained following a failure of a firmware installation on the user device; extracting a plurality of features from the obtained log data; applying the extracted features to a trained machine learning model to obtain a prediction of whether the firmware installation failure is caused by a hardware-related failure or a software-related failure; and performing an automated remedial action based on a result of the prediction. The trained machine learning model can be trained using historical data for multiple user devices that experienced a firmware installation failure, where the historical data comprises a label indicating whether a given failure comprises a hardware-related failure or a software-related failure. The trained machine learning model can be trained and tested using cross-validation techniques.

20 Claims, 7 Drawing Sheets (56) References Cited

U.S. PATENT DOCUMENTS

2021/0132936 A1* 5/2021 Arakkal .............. G06N 7/005
2021/0374567 A1* 12/2021 Bhimireddy ........ G06F 11/3006

OTHER PUBLICATIONS https://jmlr.csail.mit.edu/papers/volume6/murray05a/murray05a.pdf, downloaded Jan. 12, 2021.
https://www.researchgate.net/publication/263885625_Reliability_and_modeling_of_systems_integrated_with_firmware_and_hardware, downloaded Jan. 12, 2021.

* cited by examiner

FIRMWARE FAILURE REASON PREDICTION USING MACHINE LEARNING TECHNIQUES

FIELD

The field relates generally to information processing systems and more particularly, to the testing of such information processing systems.

BACKGROUND

Many devices include firmware that provides low-level control for the particular hardware components found in each device. If a failure occurs while a firmware image is being installed (e.g., "flashed" or "burned") on a given device, it is often difficult, for example, to identify whether the failure was the result of a software issue or a hardware issue. While software issues can often be addressed, for example, by reinstalling the firmware image on the given device, a hardware issue may require diagnostics, repairs and/or a replacement of at least portions of the given device.

A need exists for improved techniques for evaluating the cause of a firmware installation failure.

SUMMARY

In one embodiment, a method comprises obtaining log data for a user device, wherein the log data is obtained following a failure of a firmware installation on the user device; extracting a plurality of features from the obtained log data; applying the extracted features to one or more trained machine learning models to obtain a prediction of whether the firmware installation failure is caused by a hardware-related failure or a software-related failure; and performing one or more automated remedial actions based at least in part on a result of the prediction.

In some embodiments, the one or more trained machine learning models are trained using historical data for a plurality of user devices that experienced a firmware installation failure, wherein the historical data comprises a label indicating whether a given failure comprises a hardware-related failure or a software-related failure. The one or more trained machine learning models can be trained and tested using cross-validation techniques.

Other illustrative embodiments include, without limitation, apparatus, systems, methods and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

In one or more embodiments, techniques are provided for evaluating the cause of a firmware installation failure using one or more machine learning models that predict a firmware installation failure reason. One or more aspects of the present disclosure recognize that firmware installation failures due to hardware issues with a given device cannot be resolved by a reburn of the firmware image onto the given device and require a diagnostic check (and a possible repair) to be performed before re-executing the firmware burn process. As discussed further below, the disclosed machine learning models predict and classify a failure that occurs during a firmware burn of a given device as either a hardware-related failure or a software-related failure. It has been estimated that 60% of firmware installation failures are the result of software-related issues that can be resolved by reburning the failed devices.

As noted above, a firmware installation failure that may be caused by software-related issues (e.g., when the firmware installation results in bugs and/or error messages) can often be addressed, for example, by reinstalling the firmware image on the given device. A hardware issue, on the other hand, may require diagnostics, repair and/or a replacement of at least portions of the given device. Hardware-related issues that may cause firmware installation failures comprise, for example, faulty installed memory and/or hard disk issues, as would be apparent to a person of ordinary skill in the art.

Given the prediction provided by the disclosed techniques, the firmware burn process can be restarted, for example, from the stage at which the process failed for software-related issues (thereby potentially saving many hours of work and money). If a failure occurs due to a hardware-related defect, however, the failing device is typically sent to a workstation for additional diagnostics and possible repair.

Figure 1:
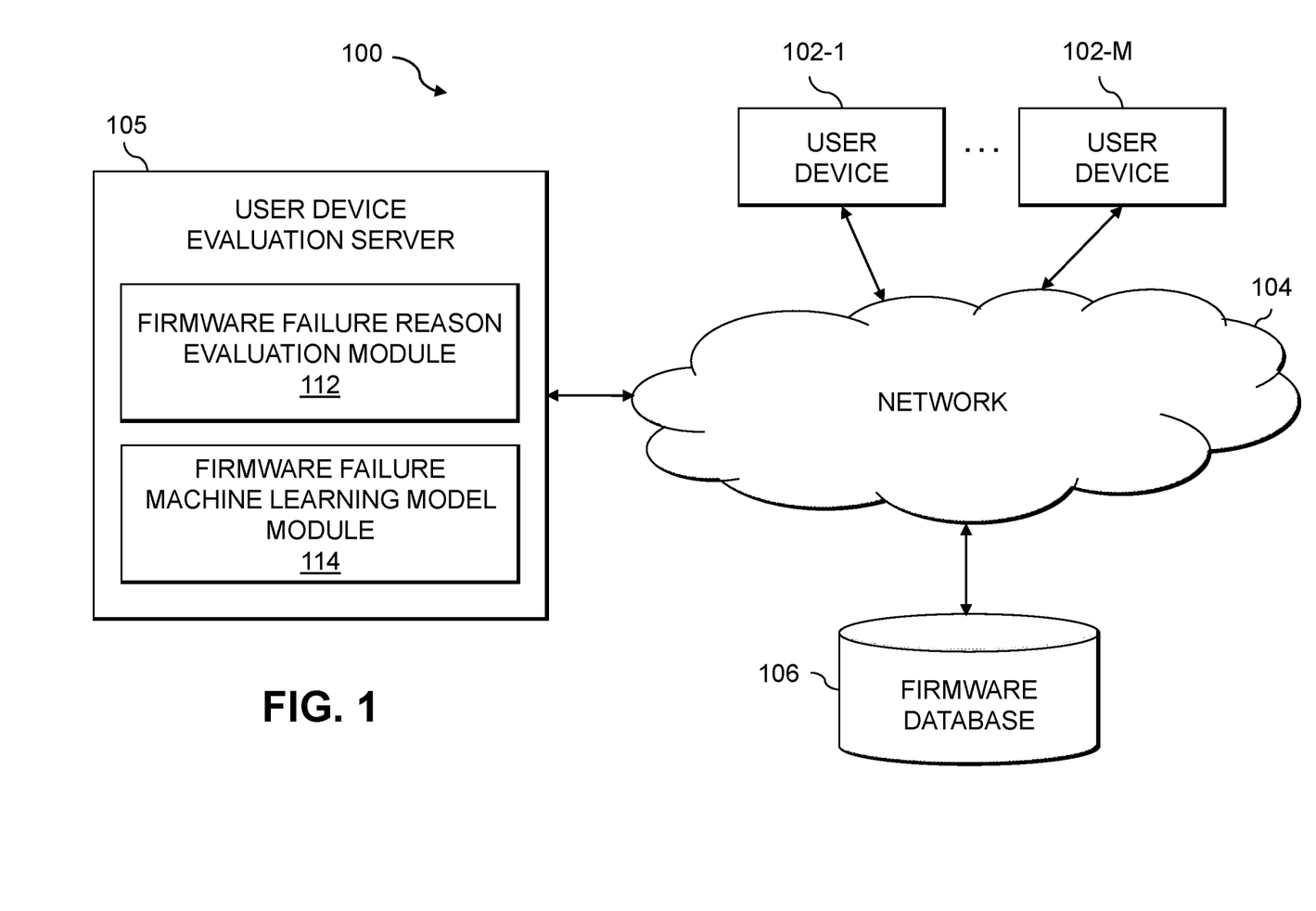
FIG. 1 illustrates an information processing system configured for predicting firmware installation failure reasons using machine learning techniques in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is user device evaluation server 105.

The user devices 102 may comprise, for example, mobile telephones, laptop computers, tablet computers, desktop computers, appliances or other types of computing devices. Such devices are examples of what are more generally referred to herein as "processing devices." Some of these processing devices are also generally referred to herein as "computers." As noted above, at least some of the user devices 102 comprise firmware that provides low-level control for the particular hardware components found in a respective user device 102.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Additionally, the user device evaluation server 105 can have an associated firmware database 106 configured to store data pertaining to firmware and/or firmware testing, such as procedures and results.

The database 106 in the present embodiment is implemented using one or more storage systems associated with the user device evaluation server 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the user device evaluation server 105 can be one or more input-output devices, which illustratively comprise keyboards, displays or other types of input-output devices in any combination. Such input-output devices can be used, for example, to support one or more user interfaces to the user device evaluation server 105, as well as to support communication between the user device evaluation server 105 and other related systems and devices not explicitly shown.

The user devices 102 and the user device evaluation server 105 in the FIG. 1 embodiment are assumed to be implemented using at least one processing device. Each such processing device generally comprises at least one processor and an associated memory, and implements one or more functional modules for controlling certain features of the user device evaluation server 105.

More particularly, user devices 102 and user device evaluation server 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 and/or the user device evaluation server 105 to communicate over the network 104 with each other (as well as one or more other networked devices), and illustratively comprises one or more conventional transceivers.

As also depicted in FIG. 1, the user device evaluation server 105 further comprises a firmware failure reason evaluation module 112 and a firmware failure machine learning model module 114.

It is to be appreciated that this particular arrangement of modules 112 and 114 illustrated in the user device evaluation server 105 of the FIG. 1 embodiment is presented by way of example only, and alternative arrangements can be used in other embodiments. For example, the functionality associated with modules 112 and 114 in other embodiments can be combined into a single module, or separated across a larger number of modules. As another example, multiple distinct processors can be used to implement different ones of modules 112 and 114 or portions thereof.

At least portions of modules 112 and 114 may be implemented at least in part in the form of software that is stored in memory and executed by a processor.

It is to be understood that the particular set of elements shown in FIG. 1 for predicting firmware installation failure reasons using machine learning techniques involving user devices 102 and user device evaluation server 105 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112 and 114 of an example user device evaluation server 105 in computer network 100 will be described in more detail with reference to the flow diagram of FIG. 5.

Figure 2:
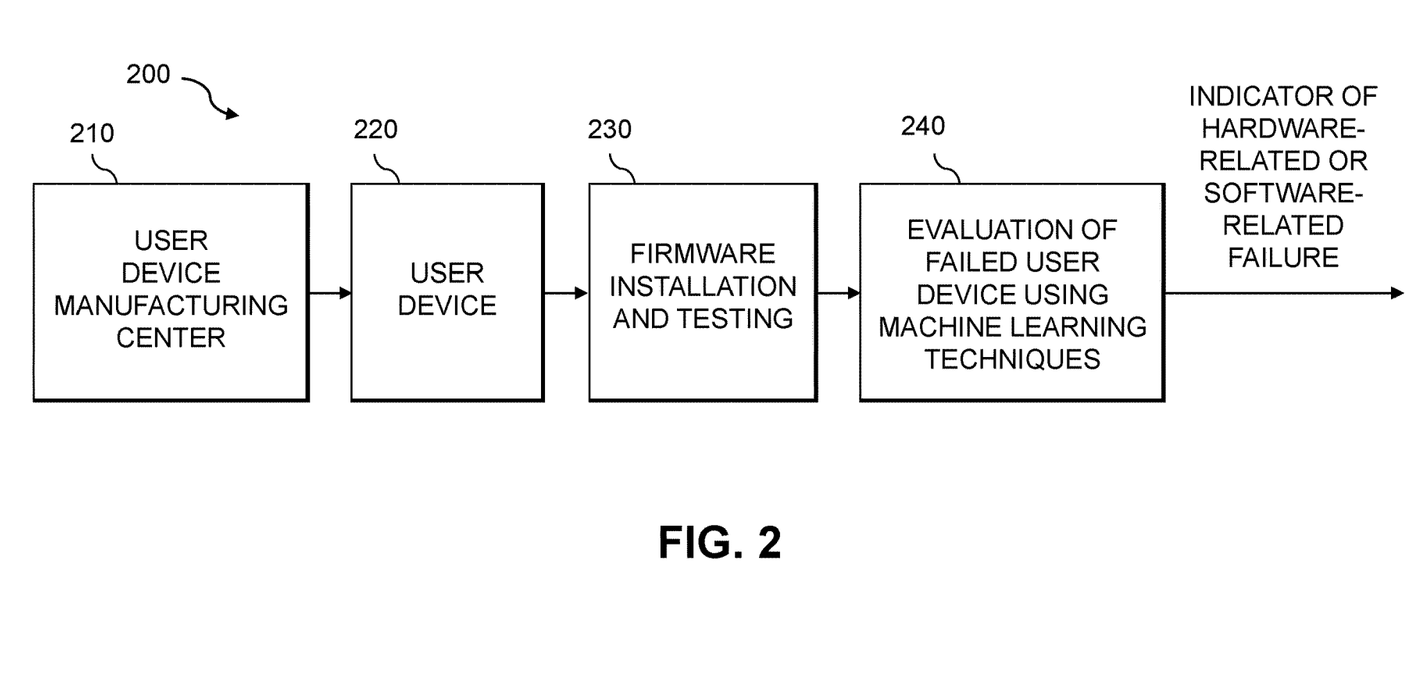
FIG. 2 illustrates a firmware evaluation environment for a user device, according to an embodiment of the disclosure.

FIG. 2 illustrates a firmware evaluation environment 200 for a user device 220, according to an embodiment of the disclosure. As shown in FIG. 2, an exemplary user device manufacturing center 210 produces the user device 220 and a firmware installation and testing process 230 is applied to the user device 220. The user device manufacturing center 210 may comprise, for example, a fabrication center of a manufacturer, or a storage warehouse (e.g., of a vendor, a seller, or a reseller of the user device 220). While one or more exemplary embodiments are illustrated in the context of firmware being installed on a recently manufactured user device 220, the disclosed techniques for evaluating the cause of a firmware failure can also be applied to evaluate a future installation of updates and/or upgrades of the firmware at a remote site, as would be apparent to a person of ordinary skill in the art. For example, the log messages associated with the failure of the firmware update from the firmware installation and testing process 230 can be read and analyzed remotely using the disclosed techniques.

If the firmware installation and testing process 230 determines that a particular user device 220 failed one or more firmware tests, an evaluation is performed at stage 240 of the failed user device 220 using the disclosed machine learning techniques, as discussed further below. The machine learning-based evaluation performed at stage 240 uses the disclosed techniques to determine if the failure is a hardware-related failure or a software-related failure.

As discussed further below in conjunction with FIG. 4, the evaluation performed at stage 240 of the failed user device 220, using the disclosed machine learning techniques, employs a set of key features that are derived from the underlying firmware installation failures and are applied to one or more machine learning algorithms that distinguish between hardware-related and software-related failures. In some embodiments, the evaluation performed at stage 240 identifies components of the user device 220 that give rise to a hardware-related failure based on model analytics, thus allowing those components that cause failure to be identified and addressed, which can reduce the number of failures, and save a significant amount of time and money in hardware replacements and additional labor costs. For example, if, out of a given number of failed units, a particular hardware issue is the primary cause of the firmware failures, a post-analytics process can be employed to identify one or more specific components causing issues using diagnostics.

Figure 3:
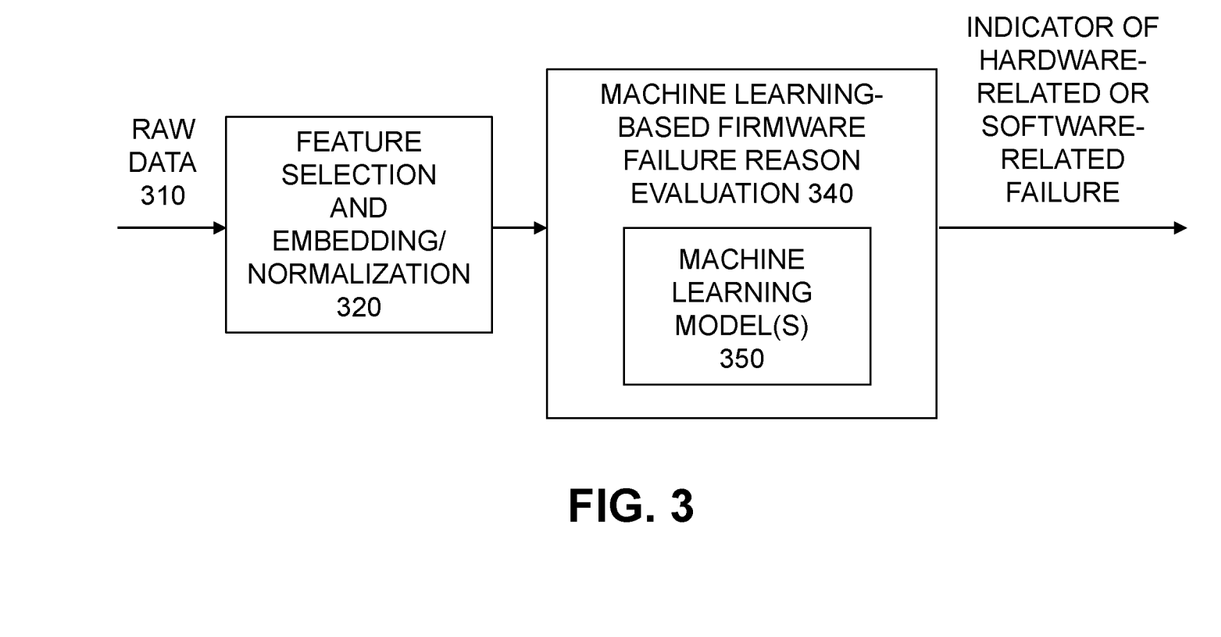
FIG. 3 is a block diagram illustrating the disclosed techniques for firmware installation failure reason prediction using one or more machine learning models, according to at least one embodiment.

FIG. 3 is a block diagram illustrating the disclosed techniques for firmware installation failure reason prediction using one or more machine learning models, according to an embodiment of the disclosure. As shown in FIG. 3, raw data 310, for example, log data from user device 220 and/or from the firmware installation and testing process 230, is applied in at least some embodiments to a feature selection and embedding/normalization process 320. The embedding phase converts categorical features into a numeric form for processing by the one or more machine learning models, as discussed below. The normalization phase normalizes the embedded features into a range between a minimum and maximum value (for example, into a range between 0 and 1).

The extracted features are then applied to a machine learning-based firmware failure reason evaluation module 340 comprising one or more trained machine learning models 350. The machine learning-based firmware failure reason evaluation module 340 processes the extracted features for a given failed user device 220 and provides an indicator of whether the failure is a hardware-related failure or a software-related failure, as discussed further below.

In one or more embodiments, the machine learning models 350 are trained and tested by the firmware failure machine learning model module 114 of FIG. 1 using cross-validation techniques. The cross-validation techniques may be employed to split an input dataset (e.g., raw data 310) into a training data set and a test data set. In some embodiments, for a k-fold cross-validation, the input data is split into k subsets of data. A machine learning model is trained on all but one (k−1) of the subsets, and the respective model is evaluated on the subset that was not used for training. This process is repeated k times, with a different subset reserved for evaluation (and excluded from training) with each iteration, as would be apparent to a person of ordinary skill in the art.

Figure 4:
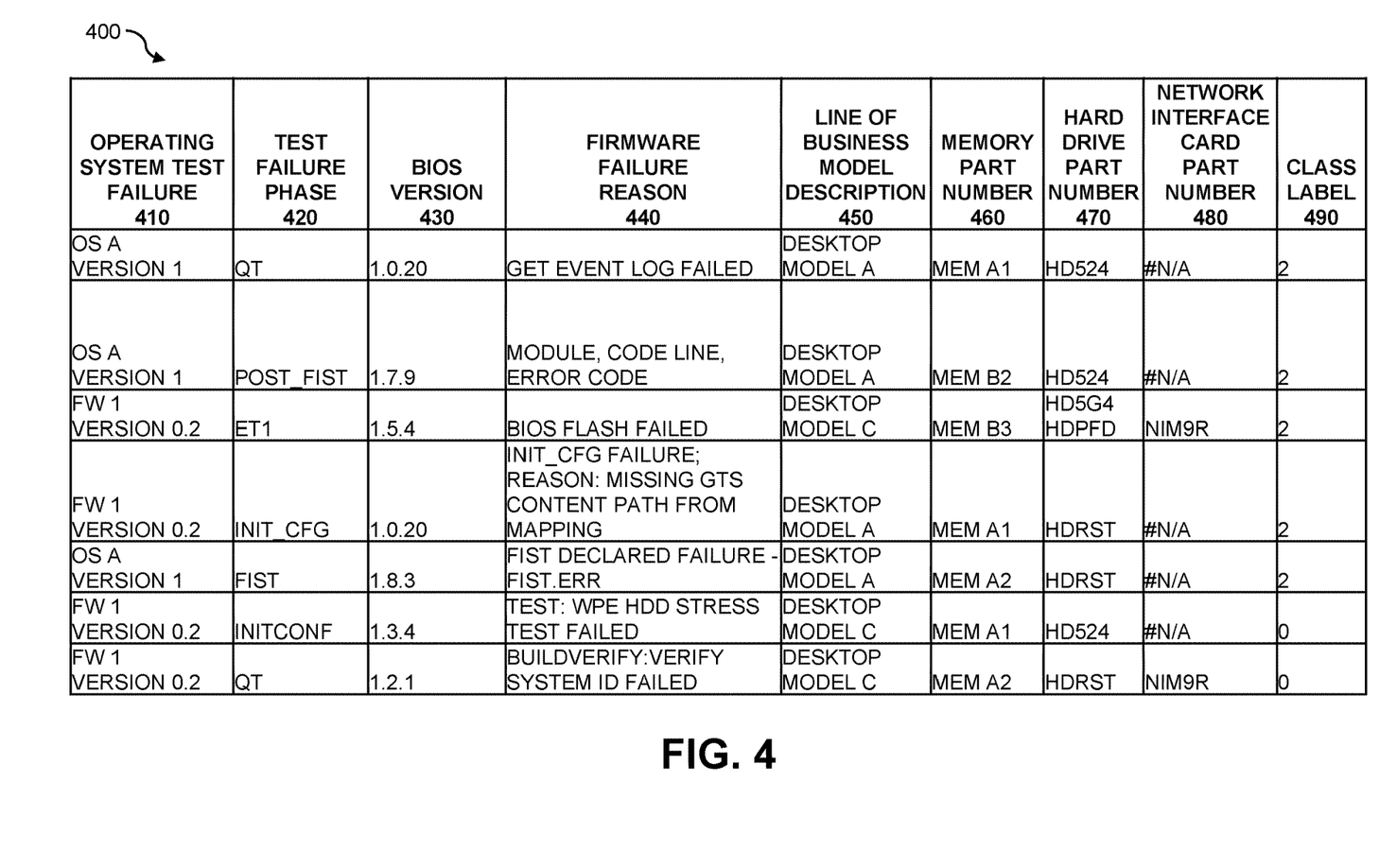
FIG. 4 is a sample table illustrating an exemplary feature set that may be processed by the machine learning-based firmware failure reason evaluation module of FIG. 3, according to at least some embodiments of the disclosure.

FIG. 4 is a sample table illustrating an exemplary feature set 400 that may be generated by the feature selection and embedding/normalization process 320 and processed by the machine learning-based firmware failure reason evaluation module 340 of FIG. 3, according to at least one embodiment. For example, an operating system test failure feature 410 identifies an operating system (OS) OR firmware (FW) version that is associated with a given firmware failure, such as a Windows PE 64-bit (WPE64) operating system and/or a Unified Extensible Firmware Interface (UEFI) firmware. A test failure phase feature 420 is used to identify the phase of a build process in which the failure occurs, such as during a quick test (QT), a BIOS Power-On Self-Test (POST), a FIST (Firmware Security Test), a First Extended test (ET1), and an initial configuration (INITCONF) test. A BIOS version feature 430 is used to expose patterns in a failure based on the BIOS version. The exemplary firmware failure reason feature 440 can link similar failure reasons to find an inherent cause of failure. For example, exemplary firmware failure reasons associated with feature 440 can provide generic error reason code descriptions that mention a possible cause of why automated test functions and/or modules failed. These firmware failure reasons can be written as part of the test code.

A line-of-business model description feature 450 provides relations between model types. A memory part number feature 460 identifies the particular memory in a failed user device 220. A hard drive part number feature 470 identifies the particular hard drive in a failed user device 220. A network interface card part number feature 480 identifies the particular network interface card in a failed user device 220. The class label 490 is used for training the machine learning models 350 (e.g., indicating whether a given failure was a hardware-related failure or a software-related failure), in a known manner.

Figure 5:
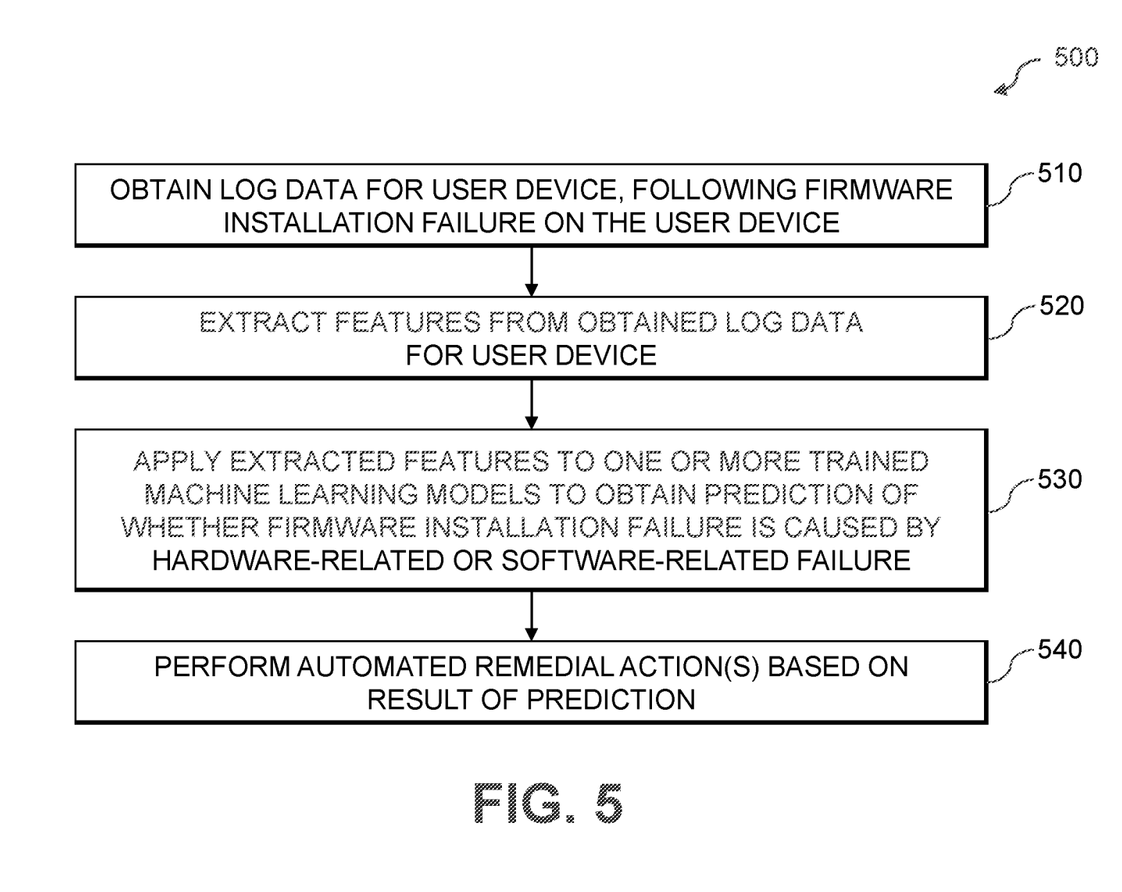
FIG. 5 is a flow diagram illustrating an exemplary implementation of a firmware installation failure reason prediction process that uses machine learning techniques, according to at least some embodiments.

FIG. 5 is a flow chart illustrating an exemplary implementation of a firmware installation failure reason prediction process 500 using machine learning techniques, according to one embodiment of the disclosure. In the example of FIG. 5, the exemplary firmware installation failure reason prediction process 500 may initially obtain log data in step 510 for a user device, wherein the log data is obtained following a failure of a firmware installation on the user device. Features are extracted from the obtained log data for the user device in step 520. Finally, the extracted features are applied in step 530 to one or more trained machine learning models to obtain a prediction of whether the firmware installation failure is caused by a hardware-related failure or a software-related failure. One or more automated remedial actions are performed in step 540, based on a result of the prediction, such as initiating a reinstallation of the firmware, initiating diagnostics on the user device, initiating a repair of the user device and/or initiating a replacement of one or more components of the user device, as discussed further below.

The particular processing operations and other network functionality described in conjunction with the flow diagram of FIG. 5, for example, are presented by way of illustrative example only, and should not be construed as limiting the scope of the disclosure in any way. Alternative embodiments can use other types of processing operations to predict firmware installation failure reasons using machine learning techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

It has been observed that existing techniques send all failed units for diagnostics since it is not known whether the failure is a hardware or software failure. The diagnostics process can add significant time that will impact the overall cycle time, reduce productivity and/or increase labor costs.

One or more aspects of the present disclosure recognize that following a firmware installation failure, it is not recommended to reboot all failure units as this requires them to repeat the burning process and will increase the overall time taken. In particular, firmware installation failures due to hardware issues with a given user device cannot be resolved by a reburn of the given user device and require a diagnostic check.

Among other benefits, the disclosed techniques for firmware installation failure reason prediction using one or more machine learning models can improve the productivity, yield and/or efficiency of the firmware burn process by improving the resolution of firmware failures due to software issues. For example, the disclosed firmware installation failure reason prediction techniques avoid wasting time by manually determining if a failure is caused by a hardware-related issue or a software-related issue.

One or more embodiments of the disclosure provide improved methods, apparatus and computer program products for predicting firmware installation failure reasons using machine learning techniques. The foregoing applications and associated embodiments should be considered as illustrative only, and numerous other embodiments can be configured using the techniques disclosed herein, in a wide variety of different applications.

It should also be understood that the disclosed firmware installation failure reason prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for predicting firmware installation failure reasons using machine learning techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments. In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based firmware installation failure reason prediction engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based firmware installation failure reason prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
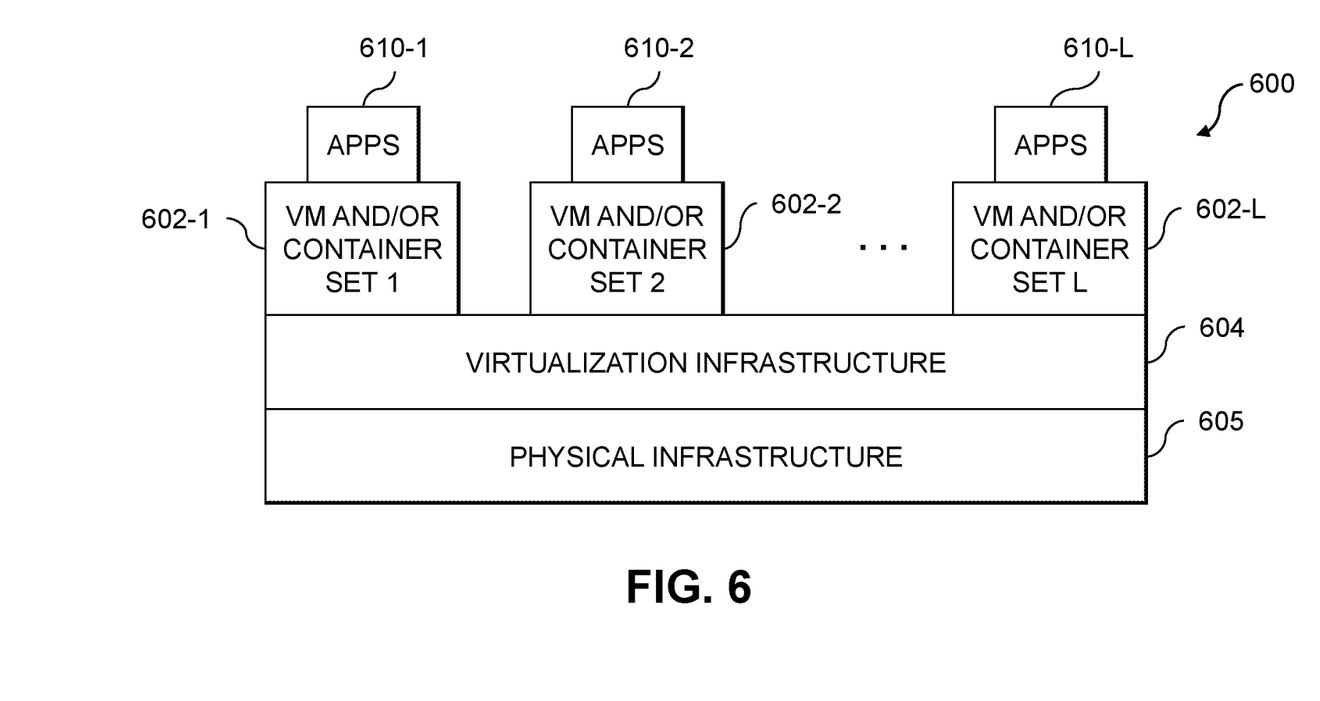
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide firmware installation failure reason prediction functionality of the type described above for one or more processes running on a given one of the VMs. For example, each of the VMs can implement firmware installation failure reason prediction control logic and associated machine learning model training functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide firmware installation failure reason prediction functionality of the type described above for one or more processes running on different ones of the containers. For example, a container host device supporting multiple containers of one or more container sets can implement one or more instances of firmware installation failure reason prediction control logic and associated machine learning model training functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
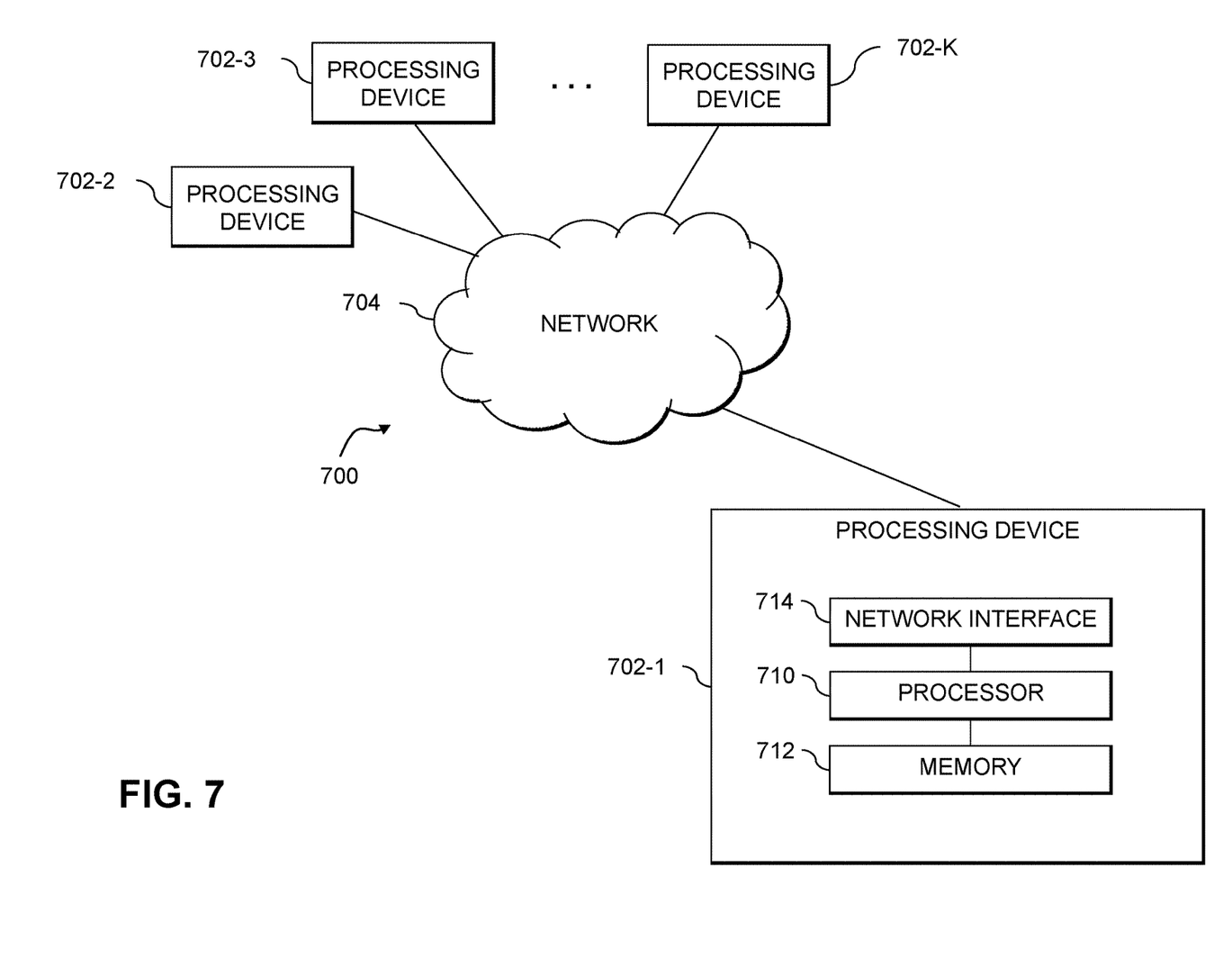
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining log data for a user device, wherein the log data is obtained following a failure of a firmware installation on the user device;
    extracting a plurality of features from the obtained log data;
    applying the extracted features to one or more trained machine learning models to obtain a prediction of whether the firmware installation failure is caused by a hardware-related failure or a software-related failure; and
    performing one or more automated remedial actions based at least in part on a result of the prediction;
    wherein the method is performed by at least one processing device comprising a processor coupled to a memory.

2. The method of claim 1, wherein the obtained log data is obtained from one or more of the user device and a system that tested the firmware of the user device.

3. The method of claim 1, wherein the extracting the plurality of features further comprises one or more of embedding and normalizing at least some of the plurality of features.

4. The method of claim 1, wherein the firmware installation failure on the user device occurs one or more of following an initial installation of the firmware and following an update of the firmware.

5. The method of claim 1, wherein the one or more automated remedial actions comprise initiating one or more of: reinstalling the firmware, performing diagnostics on the user device, repairing the user device and replacing one or more components of the user device.

6. The method of claim 1, wherein the one or more trained machine learning models are trained using historical data for a plurality of user devices that experienced a firmware installation failure, wherein the historical data comprises a label indicating whether a given failure comprises a hardware-related failure or a software-related failure.

7. The method of claim 1, wherein the one or more trained machine learning models are trained and tested using cross-validation techniques.

8. An apparatus comprising:
    at least one processing device comprising a processor coupled to a memory;
    the at least one processing device being configured to implement the following steps:
    obtaining log data for a user device, wherein the log data is obtained following a failure of a firmware installation on the user device;
    extracting a plurality of features from the obtained log data;
    applying the extracted features to one or more trained machine learning models to obtain a prediction of whether the firmware installation failure is caused by a hardware-related failure or a software-related failure; and
    performing one or more automated remedial actions based at least in part on a result of the prediction.

9. The apparatus of claim 8, wherein the obtained log data is obtained from one or more of the user device and a system that tested the firmware of the user device.

10. The apparatus of claim 8, wherein the extracting the plurality of features further comprises one or more of embedding and normalizing at least some of the plurality of features.

11. The apparatus of claim 8, wherein the firmware installation failure on the user device occurs one or more of following an initial installation of the firmware and following an update of the firmware.

12. The apparatus of claim 8, wherein the one or more automated remedial actions comprise initiating one or more of: reinstalling the firmware, performing diagnostics on the user device, repairing the user device and replacing one or more components of the user device.

13. The apparatus of claim 8, wherein the one or more trained machine learning models are trained using historical data for a plurality of user devices that experienced a firmware installation failure, wherein the historical data comprises a label indicating whether a given failure comprises a hardware-related failure or a software-related failure.

14. The apparatus of claim 8, wherein the one or more trained machine learning models are trained and tested using cross-validation techniques.

15. A non-transitory processor-readable storage medium having stored therein program code of one or more software programs, wherein the program code when executed by at least one processing device causes the at least one processing device to perform the following steps:
    obtaining log data for a user device, wherein the log data is obtained following a failure of a firmware installation on the user device;
    extracting a plurality of features from the obtained log data;
    applying the extracted features to one or more trained machine learning models to obtain a prediction of whether the firmware installation failure is caused by a hardware-related failure or a software-related failure; and
    performing one or more automated remedial actions based at least in part on a result of the prediction.

16. The non-transitory processor-readable storage medium of claim 15, wherein the obtained log data is obtained from one or more of the user device and a system that tested the firmware of the user device.

17. The non-transitory processor-readable storage medium of claim 15, wherein the extracting the plurality of features further comprises one or more of embedding and normalizing at least some of the plurality of features.

18. The non-transitory processor-readable storage medium of claim 15, wherein the one or more automated remedial actions comprise initiating one or more of: reinstalling the firmware, performing diagnostics on the user device, repairing the user device and replacing one or more components of the user device.

19. The non-transitory processor-readable storage medium of claim 15, wherein the one or more trained machine learning models are trained using historical data for a plurality of user devices that experienced a firmware installation failure, wherein the historical data comprises a label indicating whether a given failure comprises a hardware-related failure or a software-related failure.

20. The non-transitory processor-readable storage medium of claim 15, wherein the one or more trained machine learning models are trained and tested using cross-validation techniques.

\* \* \* \* \*